(12) United States Patent
Cho

(10) Patent No.: US 8,060,446 B2
(45) Date of Patent: Nov. 15, 2011

(54) METHOD OF PROVIDING SERVICES INCLUDING ESSAY PROVIDING AND REVIEW SERVICES BASED ON AUTHENTICATION OF COLLEGE STUDENTS, AND SYSTEM THEREFOR

(76) Inventor: Joungill Cho, Austin, TX (US)

( * ) Notice: Subject to any disclaimer, the term of this patent is extended or adjusted under 35 U.S.C. 154(b) by 0 days.

(21) Appl. No.: 12/248,886

(22) Filed: Oct. 9, 2008

(65) Prior Publication Data

US 2009/0089180 A1   Apr. 2, 2009

Related U.S. Application Data

(60) Provisional application No. 60/998,987, filed on Oct. 15, 2007.

(51) Int. Cl.
*G06Q 20/00* (2006.01)
(52) U.S. Cl. ............ 705/64; 726/2; 726/4; 705/67; 705/75; 705/72; 705/78; 713/182; 713/184
(58) Field of Classification Search ............ 705/64
See application file for complete search history.

(56) References Cited

U.S. PATENT DOCUMENTS

| | | | | |
|---|---|---|---|---|
| 6,088,702 A * | 7/2000 | Plantz et al. | ............ | 707/103 R |
| 6,651,071 B1 * | 11/2003 | O'Brien et al. | ............ | 707/102 |
| 7,127,404 B1 * | 10/2006 | Poon | ............ | 705/1 |
| 7,209,931 B2 * | 4/2007 | Thambidurai et al. | ...... | 707/104.1 |
| 7,321,858 B2 * | 1/2008 | Andino et al. | ............ | 705/1 |
| 7,472,827 B2 * | 1/2009 | Fletcher | ............ | 235/380 |
| 7,487,104 B2 * | 2/2009 | Sciuk | ............ | 705/7 |
| 2001/0007980 A1 * | 7/2001 | Ishibashi et al. | ............ | 705/26 |
| 2001/0042026 A1 * | 11/2001 | Hinh et al. | ............ | 705/26 |
| 2003/0031996 A1 * | 2/2003 | Robinson | ............ | 434/350 |
| 2004/0143469 A1 * | 7/2004 | Lutz et al. | ............ | 705/7 |
| 2004/0225551 A1 * | 11/2004 | Hole | ............ | 705/9 |
| 2008/0140680 A1 * | 6/2008 | Hyder et al. | ............ | 707/100 |

OTHER PUBLICATIONS

Laura Kaiser & Michael Kaiser, The Official eBay Guide to Buying, Selling, and Collecting Just About Anything, Fireside, First Edition, pp. 17-21, 28-35, 58-59, 116, 128, 244-245.*

PR Newswire, E-Learning Solution Opens the World of Higher Academics to High School and University Students, Mar. 5, 2003, LAW06705032003.*

* cited by examiner

*Primary Examiner* — Andrew J. Fischer
*Assistant Examiner* — Alexis Casey
(74) *Attorney, Agent, or Firm* — Ladas & Parry LLP

(57) ABSTRACT

Provided are a method and system for providing services based on authentication of college students. According to the present invention, a verification code is transmitted to an email account that is provided by a college, a college student who inputs the same verification code is authenticated, and the authenticated college student provides the services including an essay providing service or an essay review service, based on the verified identity of the college student.

9 Claims, 10 Drawing Sheets

Verification

College

| State | Texas (TX) ▽ |
|---|---|
| City | Austin ▽ |
| School Name | University of Texas at Austin ▽ |
| Official Student Email Issued by School | jcho@utexas.edu — 401 |

College Email Address Verification  [Email Me My Verification Code] — 402

Note 1: MUST use an offical student email Issued by the college specified above.
Note 2: Please email us at update@essaymine.com if your school is not in our database.

Now, please check your email and enter your verification code below.
In case you can't find the verification email in your inbox due to the filtering, please check your other mail foders.

Enter Your Verification code Here.  [RWsOKfdL] [Confirm]
                                       403       404

[Close]

FIG. 5

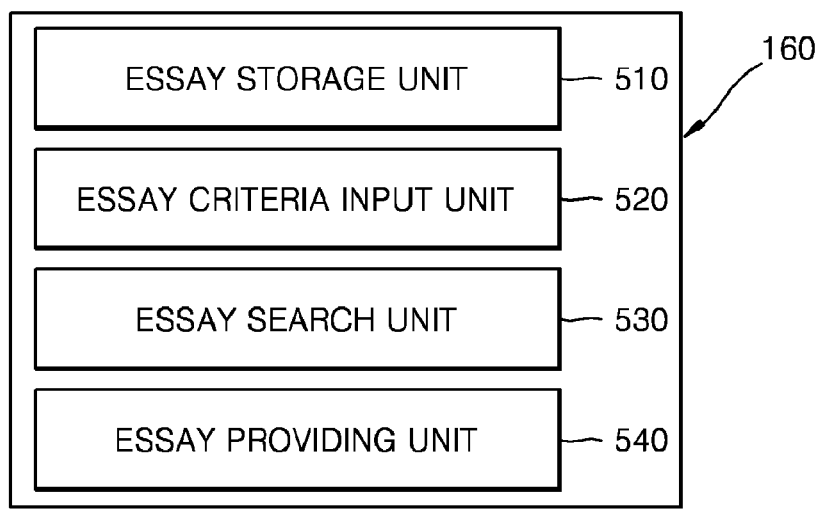

FIG. 8 e'essaymine™  | Home | essaymine™ | MyKindaSchool | MyAccount

Review Requests  Review Folder  Essay Search  Essay Folder  Essay Cart

Joungill Cho [Upate]
Communications Summary
Incoming Messages 2
Review Request: Inquiries 1
Account Overview
No. of Essay Sold 7
No. of Review Served 3
No. of Referral 0
[Sign Out]

Add an image to your website so that others can visit essaymine™ with your referral code.
[e'essaymine]

— Essay Search

Detailed View                                Open Another Essay Listed by this Seller  [What you do in the c...  ▼]

School Applied: Florida Carrer College: Miami
School Location: Florida – Miami
User ID: mezzo
Verified College Email Address: ******@msn.com
No. of Peer Verification: 0
No. of Essays Sold: 3                        Buyer Satisfaction: ★★★★★
Undergraduate Major: Education
Graduate Program: Business School            Extracurricular Activity: Drama Test & Score Range
| Test Name | Test Category | Score Range | No. of Tests Taken |
|---|---|---|---|
| TOTEL | iBT | 100~120 | |

Admission Year: 2003
Admission Type:                              Admission Result: Waitlisted
Listed Date: 03/07/2008                      Last Updated Date: 03/13/2008
Essay Topic/Question:

> How do you spend your time when you are not in class of studyaing?

Essay Title:

> What you do in the classroom defines only a part of who you are.

Essay Title:

> stared at a photograph of a young boy on tip-toes, grimacing and straining to get a large orange rubber ball through a homemade hoop attached to a chain-link fence. My parents told me it was the birth of my love for the game of basketball. A few years ago, when I asked my mother and father when and how came to love basketball, they did not begin a wistful tale of a childhood since past, but rather pointed me to ward an old photo album that contained that very photograph. Curiosity filled my mind as I wondered why I had not chosen to play baseball, football, or any other sport. But when I focused on that photograph, I remembered how much I loved to stretch my arms up to the sky, let go a jump shot, and watch the ball swish majestically throught the hoop.

Inclusion of Essay Strength Description: Yes
Inclusion of Essay Weakness Description: Yes
Inclusion of Over all Comment/Advice: Yes
Note: Author's indetifiable information (including real name, address, etc.) may have been modified in order to protect his/her privacy.

[Add to Cart]

Terms & conditions | Privacy Policy | Anti-Plagiarism Statement | FAQ | Contact Us
COPYRIGHT © 2008 CREATIVE NAPKIN, LLC. ALL RIGHTS RESERVED.

METHOD OF PROVIDING SERVICES INCLUDING ESSAY PROVIDING AND REVIEW SERVICES BASED ON AUTHENTICATION OF COLLEGE STUDENTS, AND SYSTEM THEREFOR

CROSS-REFERENCE TO RELATED PATENT APPLICATION

This application claims the benefit of U.S. Provisional Patent Application No. 60/998,987, filed on Oct. 15, 2007, in the U.S. Patent and Trademark Office, and the benefit of Korean Patent Application No. 10-2008-0078125, filed on Aug. 8, 2008, in the Korean Intellectual Property Office, the disclosures of which are incorporated herein in their entirety by reference.

BACKGROUND OF THE INVENTION

1. Field of the Invention

The present invention relates to a method and system for providing services based on identities of college students between the college students and students who desire to enter colleges or universities, and more particularly, to a method and system for providing services based on authentication of college students in countries such as the U.S.A. where an essay is a significant part of an entrance examination to a college or a university.

2. Description of the Related Art

Many college students have part time jobs for personal expenses or tuition fees.

Generally these part time jobs, for example, working at a convenience store, are not directly related to identities of the college students. However, tutoring high school students or reviewing essays of the high school students is directly related to the identities of the college students.

In other words, a client who requests a college student for tutoring or reviewing essays may regard an identity or a school of the college student as an important factor for employment.

If the college student is introduced by a friend of the client, the client can trust the identity. If not, the client may have doubts about the authenticity of the identity.

In particular, if the college student is found from an online market, the client has to totally rely on descriptions directly made by the college student or made by an operator of a web site. The client has no other choice.

In this case, the operator cannot verify the identity of the college student unless the operator receives documentation such as a certificate of studentship and directly checks the certificate with a school. Accordingly, even if the client trusts the operator of the web site, the client cannot be totally sure about the reliability of the identities of college students joining the web site.

SUMMARY OF THE INVENTION

The present invention provides a system for providing services including essay selling and review services based on identities of college students by authenticating the college students.

The present invention also provides a method of providing services based on identities of college students by authenticating the college students through the system, and a computer readable recording medium having recorded thereon a computer program for executing the method.

According to an aspect of the present invention, there is provided a service providing system based on authentication of college students, the service providing system including an input unit receiving at least a name of a school which a college student member currently attends and his or her email address issued by the school, from the college student member who wants to be authenticated; a verification code transmission unit creating and transmitting a first verification code of the college student member to the email address; an authentication unit receiving a second verification code from the college student member and authenticating the college student member if the second verification code is identical to the first verification code; and a service providing unit providing a service of the college student member who is authenticated by the authentication unit, to a buyer who requests the service.

The service providing system may further include an email verification unit verifying whether the email address is issued by the school by using the name of the school and the email address which are input through the input unit.

The input unit may further receive an email address of a fellow student of the college student member, from the college student member, the verification code transmission unit may further create and transmit a third verification code of the fellow student to the email address of the fellow student, and the authentication unit may receive a fourth verification code from the fellow student and authenticate the college student member only if the fourth verification code is identical to the third verification code.

The service provided through the service providing unit may be an essay providing service, and the service providing unit may include an essay storage unit receiving and storing essays which are written by college student members for entrance examinations; an essay criteria input unit receiving essay search criteria from the buyer; an essay search unit extracting essays corresponding to the search criteria input through the essay criteria input unit, from among the essays which are stored in the essay storage unit; and an essay providing unit providing an essay which is selected by the buyer from among the extracted essays, to the buyer.

The service provided through the service providing unit may be an essay review service, and the service providing unit may include a reviewer search condition input unit receiving reviewer search criteria for a reviewer to provide the essay review service, from the buyer; a reviewer search unit extracting names of reviewers who are college student members and correspond to the reviewer search criteria, from among college student members who registered themselves as reviewers; a review request transmission unit transmitting a review request message to a reviewer who is selected by the buyer from among the extracted names of reviewers; a review acceptance check unit receiving an input regarding review acceptance or refusal in response to the review request message, from the reviewer who the review request message is transmitted to; and a review service providing unit providing an essay of the buyer to the reviewer who accepted the essay review service so that the reviewer can review the essay.

According to another aspect of the present invention, there is provided a service providing method based on authentication of college students, the service providing method including receiving at least a name of a school which a college student member currently attends and his or her email address issued by the school, from the college student member who wants to be authenticated; creating and transmitting a first verification code of the college student member to the email address; receiving a second verification code from the college student member and authenticating the college student member if the second verification code is identical to the first verification code; and providing a service of the college student member who is authenticated by the authentication unit, to a buyer who requests the service.

The service may be an essay providing service, and the providing of the service may include receiving and storing essays which are written by college student members for entrance examinations; receiving essay search criteria from the buyer; extracting essays corresponding to the search criteria, from among the stored essays; and providing an essay which is selected by the buyer from among the extracted essays, to the buyer.

The service provided through the service providing unit may be an essay review service, and the providing of the service may include receiving reviewer search criteria for a reviewer to provide the essay review service, from the buyer; extracting names of reviewers who are college student members and correspond to the reviewer search criteria, from among college student members who registered themselves as reviewers; transmitting a review request message to a reviewer who is selected by the buyer from among the extracted names of reviewers; receiving an input regarding review acceptance or refusal in response to the review request message, from the reviewer who the review request message is transmitted to; and providing an essay of the buyer to the reviewer who accepted the essay review service so that the reviewer can review the essay.

According to another aspect of the present invention, there is provided a computer readable recording medium having recorded thereon a computer program for executing a service providing method based on authentication of college students, the service providing method including receiving at least a name of a school which a college student member currently attends and his or her email address issued by the school, from the college student member who wants to be authenticated; creating and transmitting a first verification code of the college student member to the email address; receiving a second verification code from the college student member and authenticating the college student member if the second verification code is identical to the first verification code; and providing a service of the college student member who is authenticated by the authentication unit, to a buyer who requests the service.

BRIEF DESCRIPTION OF THE DRAWINGS

The above and other features and advantages of the present invention will become more apparent by describing in detail exemplary embodiments thereof with reference to the attached drawings in which:

FIG. 3 is an image of a screen for joining a web site, according to an embodiment of the present invention;

FIG. 4 is an image of a screen for inputting a verification code by a college student member, according to an embodiment of the present invention;

FIG. 5 is a block diagram of a service providing unit illustrated in FIG. 1 when an authenticated college student member provides a service of providing his or her essay written for an entrance examination, according to an embodiment of the present invention;

FIG. 8 is an image of an abstract screen of an extracted essay in order to help a buyer to select an essay to purchase, according to an embodiment of the present invention;

DETAILED DESCRIPTION OF THE INVENTION

Hereinafter, the present invention will be described in detail by explaining embodiments of the invention with reference to the attached drawings.

Figure 1:
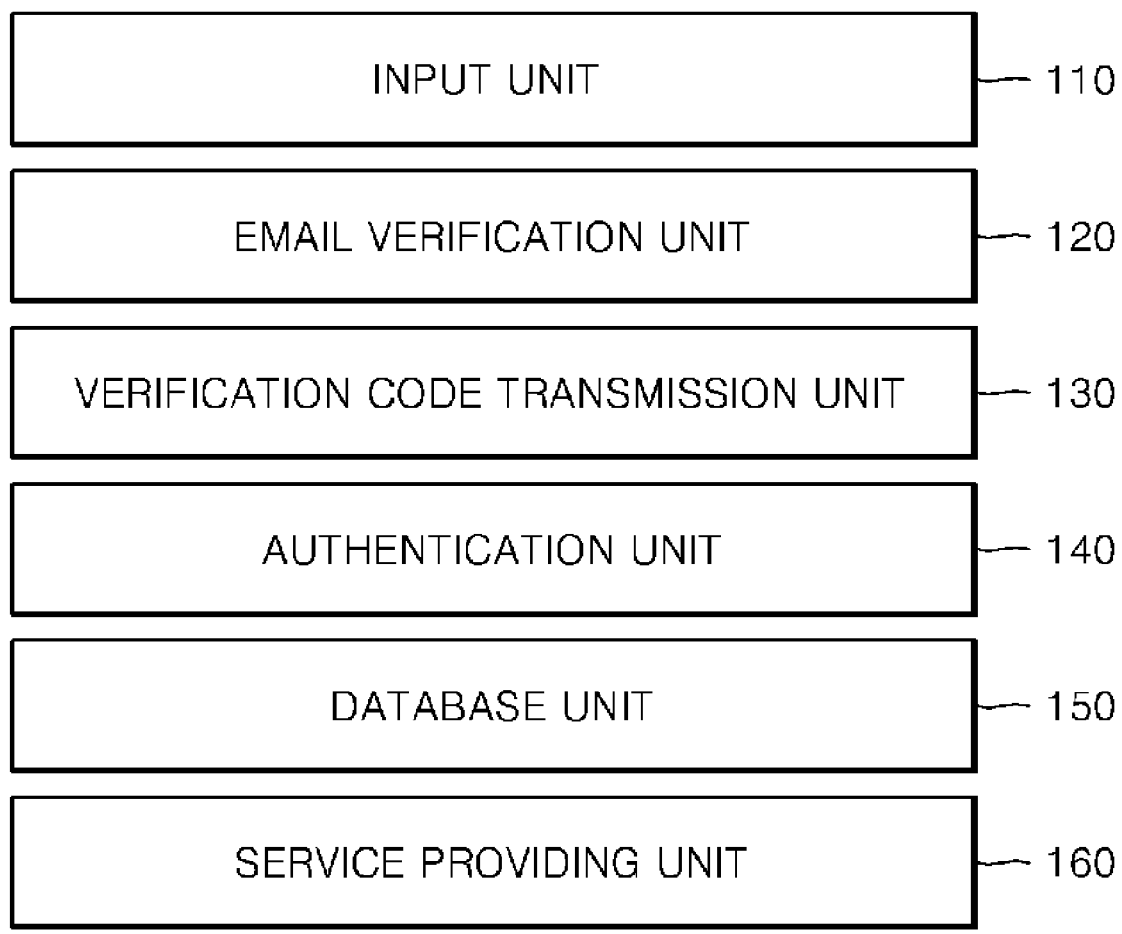
FIG. 1 is a block diagram of a system according to an embodiment of the present invention.

FIG. 1 is a block diagram of a system according to an embodiment of the present invention.

Referring to FIG. 1, the system according to the current embodiment of the present invention includes an input unit 110, an email verification unit 120, a verification code transmission unit 130, an authentication unit 140, a database 150, and a service providing unit 160.

The input unit 110 receives various types of information from a college student member who wants to be authenticated on a web site using the system according to the current embodiment of the present invention and to sell his or her services based on the authentication.

In the present invention, a college student is a student of a college, that is, in a narrow sense, a student who currently attends a college, and includes, in a broader sense, the concept of a student of a university or a graduate school.

Also, in the present invention, a college student member includes the concept of a college student who is an official member of a web site and whose identity is verified, a college student who is an official member of a web site and whose identity is not yet verified, and a college student who wants to be an official member of a web site and to verify his or her identity.

The information input through the input unit 110 basically includes a name of a school which he or she currently attends and his or her email address issued by the school. The name of the school and the email address issued by the school are used to verify the identity of the college student member.

Also, other information for authenticating the college student member may be added.

For example, if the college student member is additionally authenticated by fellow students, email addresses of the fellow students are input.

Furthermore, the input unit 110 receives information corresponding to search criteria that are used when buyers search for the college student member for the services provided by the college student member. The search criteria may include his or her score in an entrance examination of the school, various extracurricular activities that were considered in the entrance examination, a title of his or her essay, a search keyword contained in the essay, an admission year, a name of an applied school, admission results, and other various types of information related to the essay. The input information is stored in the database 150.

The email verification unit 120 performs primary authentication by comparing the name of the school to a domain of the email address.

For example, if the college student member inputs 'University of Texas' as the name of the school, the email verification unit 120 verifies whether the email address has the form of '***@utexas.edu'.

The email verification unit 120 performs the primary authentication as described above by matching the input information to stored information regarding the form of a specific domain of a corresponding school, so as not only to verify whether the email address ends with '.edu'.

When the college student member is additionally authenticated by the fellow students, the email verification unit 120 also performs the primary authentication on the fellow students by using the email addresses of the fellow students, which are input by the college student member in order to verify his or her identity.

If the primary authentication is successfully performed by the email verification unit 120, the verification code transmission unit 130 creates a specific verification code for the college student member by using, for example, a random function, and transmits the verification code to the email address that is input by the college student member through the input unit 110.

If the college student member inputs the verification code received by his or her email address through the verification code transmission unit 130 when he or she contacts the web site (or while he or she is contacting the web site), the authentication unit 140 authenticates the college student member by using the verification code input by the college student member and information transmitted by the verification code transmission unit 130.

FIG. 4 is an image of a screen for inputting a verification code by a college student member, according to an embodiment of the present invention.

Referring to FIG. 4, if an 'Email Me My Verification Code' button 402 is clicked, the verification code is transmitted to an email address 401 input by the college student member. If the transmitted verification code is input in an input box 403 and then a 'Confirm' button 404 is clicked, an authentication result is output.

Email accounts issued by a college may not be used by general people who are not students of the college so as to more definitely verify identities of the students of the college compared to any other authentication means. Also, the email accounts may be used without any special device or equipment for authentication so as to be a very efficient authentication means.

Referring back to FIG. 1, if the college student member is additionally authenticated by fellow students, the verification code transmission unit 130 creates and transmits verification codes to email addresses of the fellow students, which are input by the college student member in order to verify his or her identity. If the fellow students contact a web site and input the verification codes, the authentication unit 140 compares the input verification codes to the transmitted verification codes so as to authenticate the college student member.

The service providing unit 160 connects the college student member whose identity is verified with buyers who want to get services provided by the college student member, so as to make a deal therebetween.

The services that may be provided by the college student member representatively include services related to experiences achieved from an entrance examination and while he or she is in school, for example, a service of providing his or her essay written for an entrance examination to a college in the U.S.A., a service of reviewing another person's essay based on his or her experience of achieving admission, and a service of providing information regarding his or her school.

Figure 2:
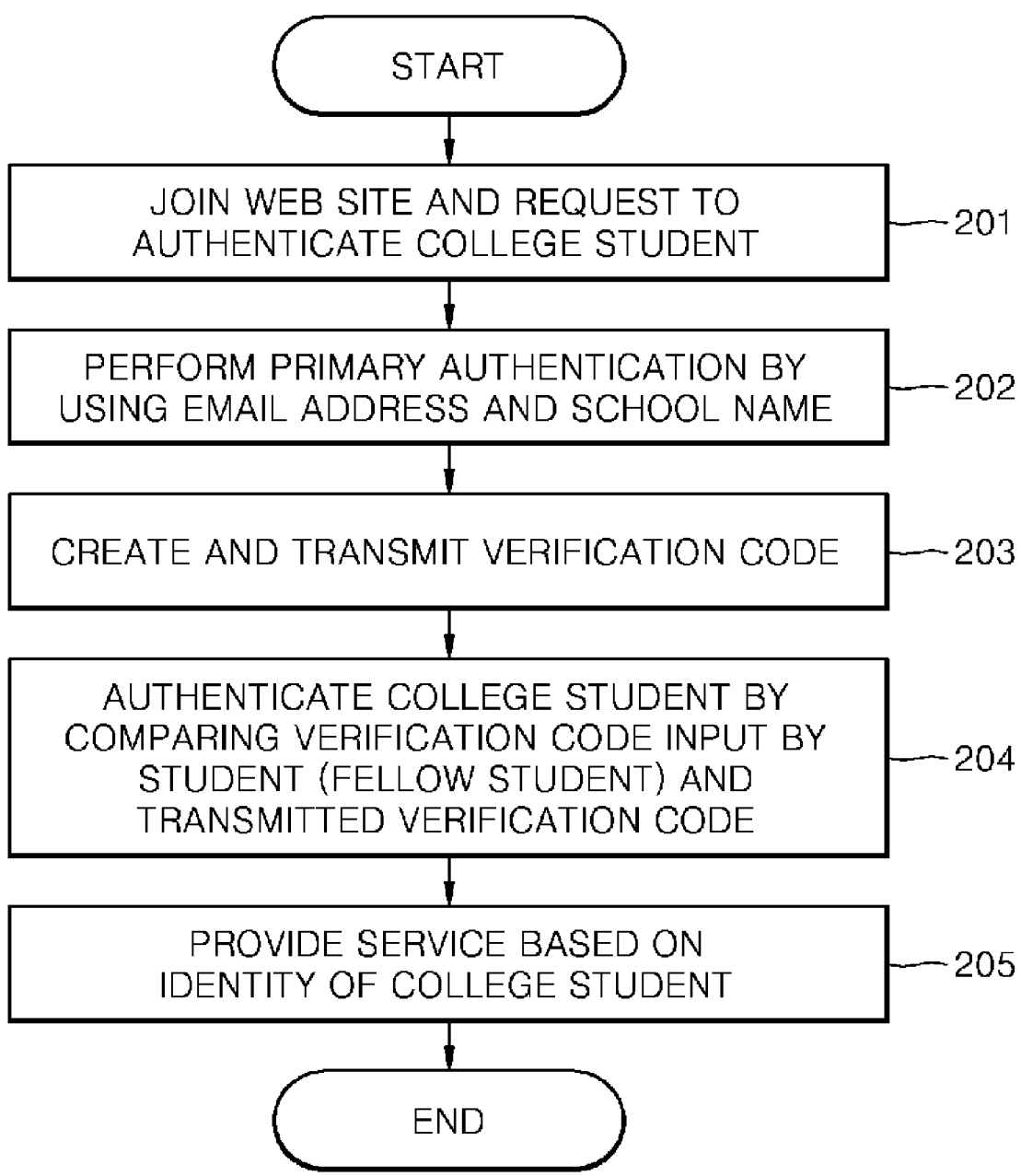
FIG. 2 is a flowchart of a method of authenticating a college student, according to an embodiment of the present invention.

FIG. 2 is a flowchart of a method of authenticating a college student, according to an embodiment of the present invention. FIG. 2 will be described in conjunction with FIG. 1.

Referring to FIG. 2, initially, a college student who wants to provide services so as to make a profit through a web site using the system illustrated in FIG. 1, joins the web site and requests authentication, in operation 201.

If the college student member requests authentication through the input unit 110, the college student member inputs basic information including a name of a school which he or she currently attends and an email address issued by the school, which is required to verify his or her identity. If additional authentication is required by fellow students, the college student member inputs email addresses of the fellow students.

Also, the college student member inputs information corresponding to search criteria that are used when buyers search for the college student member for the services provided by the college student member, for example, his or her score in an entrance examination of the school, and various extracurricular activities that were considered in the entrance examination.

Figure 3:
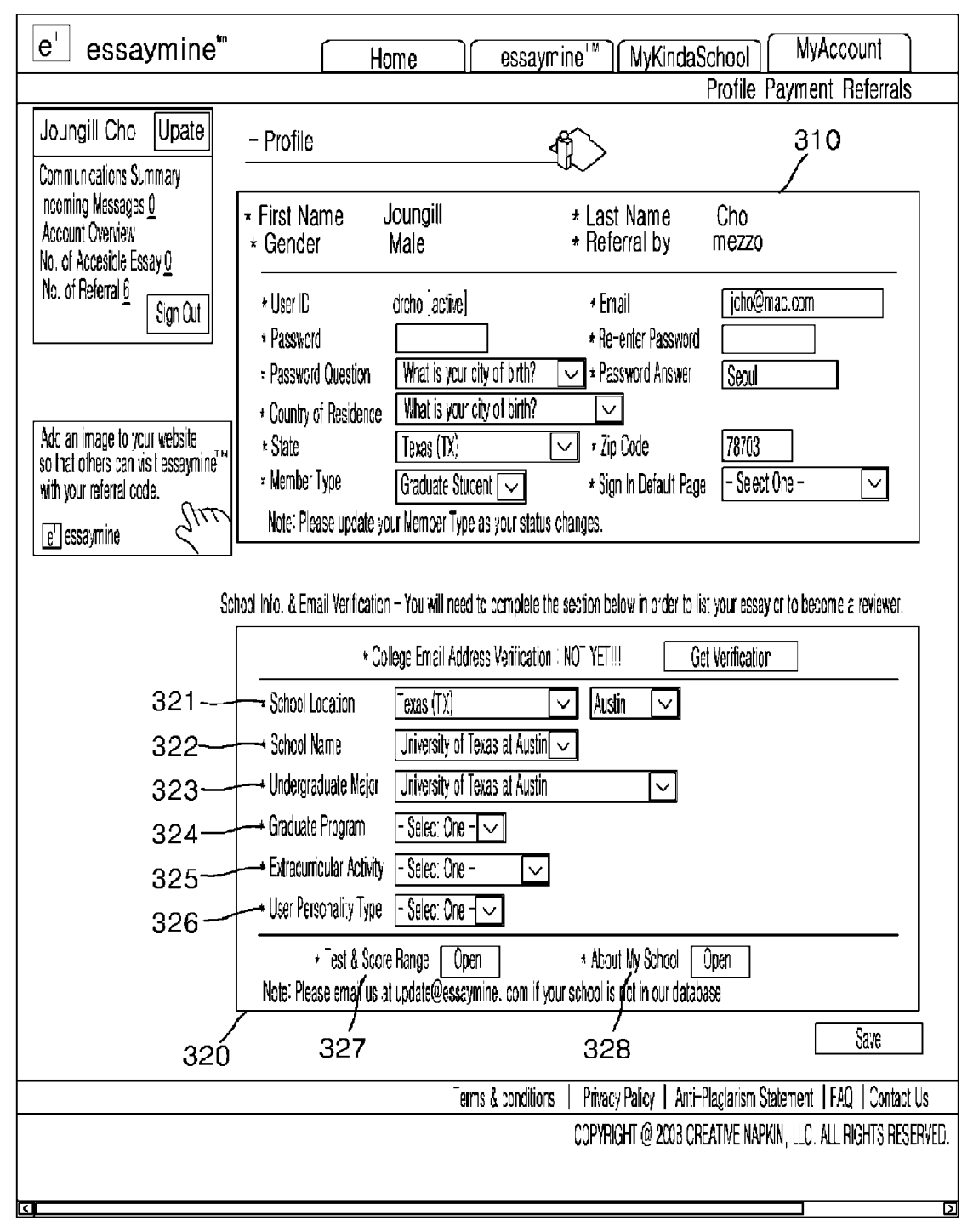

FIG. 3 is an image of a screen for joining a web site, according to an embodiment of the present invention.

Referring to FIG. 3, the input unit 110 illustrated in FIG. 1 includes a basic personal information input unit 310 to be used to manage members, and also includes an additional information input unit 320 including a 'School Location' box 321, a 'School Name' box 322, an 'Undergraduate Major' box 323, a 'Graduate Program' box 324, an 'Extracurricular Activity' box 325, a 'User Personality Type' box 326, a 'Test & Score Range' box 327, and an 'About My School' box 328, in order to receive various types of information from college student members.

Referring back to FIG. 2, when the required information is input through the input unit 110, the email verification unit 120 performs primary authentication by comparing the name of the school to a domain of the email address, in operation 202.

As described above with reference to FIG. 1, when the college student member is additionally authenticated by the fellow students, the email verification unit 120 also performs the primary authentication on the fellow students by using the email addresses of the fellow students, which are input by the college student member in order to verify his or her identity.

Since authentication is performed twice by using email addresses and verification codes, the primary authentication may not be necessarily performed. However, primary filtering may be achieved by performing the primary authentication and thus unnecessary waste of resources of the system may be prevented. Accordingly, the performing of the primary authentication is preferable.

If the email verification unit 120 determines that the name of the school corresponds to the domain of the email address, the verification code transmission unit 130 creates and transmits a verification code to the email address that is input by the college student member, in operation 203.

When the college student member is additionally authenticated by the fellow students, the verification code transmission unit 130 also creates and transmits verification codes to the email addresses of the fellow students, which are input by the college student member.

If the college student member inputs the verification code received at his or her email address through the verification code transmission unit 130 when he or she contacts the web site (or while he or she is contacting the web site), the authentication unit 140 authenticates the college student member by using the verification code input by the college student member and information transmitted by the verification code transmission unit 130, in operation 204.

When the college student member is additionally authenticated by the fellow students, if the fellow students contact the web site and input the verification codes, the authentication unit 140 compares the input verification codes to the transmitted verification codes so as to authenticate the college student member.

If the authentication is additionally performed by the fellow students, it is preferable that basic information of the fellow students, for example, names and email addresses, and the number of the fellow students used for the authentication, are stored in the database 150 so as to be provided to buyers when the buyers search for information regarding the college student member.

The more fellow students participate in authentication of a college student member, the higher the reliability of his or her identity.

Meanwhile, if the status of the college student member is changed due to, for example, transferring to a new school, it is preferable to update member information through a re-authentication process instead of a newly joining process.

In more detail, if the college student member contacts the web site by using existing user identification (ID) and passwords, inputs a new email address issued by the new school, and requests re-authentication, the re-authentication is performed by transmitting a verification code to the new email address and confirming the verification code, as described above.

In this case, existing data registered by the college student member may be continuously used without newly registering the data.

When the authentication is performed as described above, the service providing unit 160 connects the college student member whose identity is verified and the buyers who want to get the services provided by the college student member, so as to make a deal therebetween, in operation 205.

As described above with reference to FIG. 1, the services that may be provided by the college student member representatively include services related to experiences achieved from an entrance examination and while he or she is in school, for example, a service of providing his or her essay written for an entrance examination to a college in the U.S.A., a service of reviewing another person's essay based on his or her experience for achieving admission, and a service of providing information regarding his or her school.

A method of providing each type of service will now be described.

FIG. 5 is a block diagram of the service providing unit 160 illustrated in FIG. 1 when an authenticated college student member provides a service of providing his or her essay written for an entrance examination, according to an embodiment of the present invention.

Referring to FIG. 5, the service providing unit 160 according to the current embodiment of the present invention includes an essay storage unit 510, an essay criteria input unit 520, an essay search unit 530, and an essay providing unit 540.

The essay storage unit 510 stores essays of each of college student members.

When a college student member registers his or her essay after an authentication process, the college student member may input search criteria including a name of an applied school, an admission year, an admission result, a title of the essay, a search keyword contained in the essay, some text of the essay, and various advices and other information related to the essay. The search criteria may be stored in the essay storage unit 510 together with the essay, or be stored in the database 150 illustrated in FIG. 1.

In this case, the name of the applied school does not always need to be identical to a name of a school which he or she currently attends, which is input in the authentication process. A name of a school where the essay is actually submitted may be input.

For example, if the college student member previously applied and submitted essays to 'Harvard University' and 'Yale University', and currently attends 'Yale University', the college student member may separately register the two essays. When an essay that was submitted to 'Harvard University' is registered, the college student member may input 'Harvard University' as the name of the applied school and input whether admission to 'Harvard University' was achieved, as the admission result.

The essay criteria input unit 520 receives search criteria regarding desired essays to purchase, from a buyer.

In general, buyers who want to purchase essays may be high school students who want to enter colleges in the U.S.A. or college students who want to enter graduate schools, and may have different desired essays according to desired schools and their Scholastic Aptitude Test (SAT) scores.

Although essays for entering colleges in the U.S.A. may be generally obtained from books and Internet sites, these essays are merely well-written essays obtained without considering other criteria and may not be directly helpful for entrance examinations.

For example, if a student has a high SAT score, although his or her essay is not written quite well, admission may be achieved. On the other hand, if the student has a low SAT score, his or her essay has to be written quite well. This may not be considered regarding conventionally provided essays.

Also, colleges may have different standards of evaluating essays and thus the same essay may be differently evaluated from the colleges. This may not be considered regarding the conventionally provided essays, either.

As such, if essays of students who achieved admission to colleges are referred together with the other criteria and if essays of a plurality of students who achieved admission to one college are referred together, a student who wants to enter a desired college may easily expect information such as important points of essays when the college evaluate the essays, a tendency of essay requirements of the college, and a level of an essay for achieving admission under similar conditions.

Figure 6:
FIG. 6 is an image of a screen provided to a buyer by an essay criteria input unit illustrated in FIG. 5 in order to specify essay search criteria, according to an embodiment of the present invention.

FIG. 6 is an image of a screen provided to a buyer by the essay criteria input unit 520 illustrated in FIG. 5 in order to input essay search criteria, according to an embodiment of the present invention.

Referring to FIG. 6, the buyer may search for desired essays by using criteria such as a school name, an admission year, an extracurricular activity, an essay keyword, and various test scores.

Meanwhile, the buyer may search for desired essays by inputting all items shown in FIG. 6. However, the buyer may input search criteria by specifying one or more of the items.

For example, the buyer may search for essays by using only a name of an applied school, or by inputting only a keyword included in the essays in order to search for essays based on a desired topic.

Referring back to FIG. 5, the essay search unit 530 extracts the names of college student members who wrote the desired essays and extracts essays provided by the college student members from the database 150 illustrated in FIG. 1, by using the search criteria input through the essay criteria input unit 520 and criteria regarding the college student members, which are stored in the database 150 illustrated in FIG. 1.

Figure 7:
FIG. 7 is an image of an output screen of essays extracted by an essay search unit illustrated in FIG. 5, according to an embodiment of the present invention.

FIG. 7 is an image of an output screen of essays extracted by the essay search unit 530 illustrated in FIG. 5, according to an embodiment of the present invention. FIG. 8 is an image of an abstract screen of an extracted essay in order to help a buyer to select an essay to purchase, according to an embodiment of the present invention.

As illustrated in FIG. 8, the abstract screen provides an abstract of the essay and also provides a name of a school which a college student member who wrote the essay attends, a result of verifying identity of the college student member, the number of fellow students who authenticate the college student member, a title of the essay, an admission year, a name of an applied school, an admission result, the number of times that the essay was sold, a buyer satisfaction rating, the number of words included in the essay, an extracurricular activity, a score in an entrance examination, and other various types of information related to the essay, which may help the buyer to conveniently select an essay to purchase.

Referring back to FIG. 5, if the buyer selects and pays for an essay, the essay providing unit 540 provides the selected essay to the buyer.

A separate payment system (not shown) may perform the payment by using a conventional electronic commerce payment method through the Internet and thus detailed descriptions thereof will be omitted here.

When the payment is performed, a whole payment or an amount deducted by a transaction fee from the whole payment is provided to a college student member who registered the essay.

Meanwhile, when the essay is provided to the buyer, an electronic file of the essay itself can be provided to the buyer. However, it is preferable to provide authority to only access the essay for a predetermined period of time in order to prevent illegal distribution of the essay.

Figure 9:
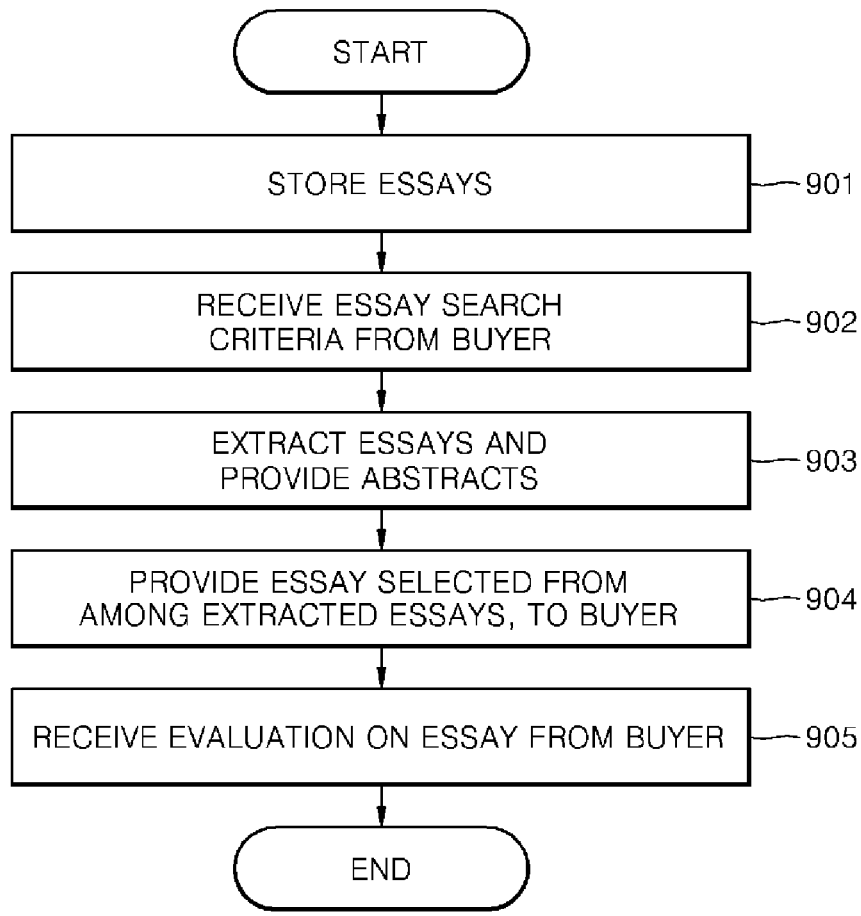
FIG. 9 is a flowchart of a method of providing an essay providing service, according to an embodiment of the present invention.

FIG. 9 is a flowchart of a method of providing an essay providing service, according to an embodiment of the present invention. FIG. 9 will be described in conjunction with FIG. 5.

Referring to FIG. 9, initially, if a college student member whose identity is verified transmits his or her essay written for an entrance examination, the essay storage unit 510 receives and stores the essay, in operation 901. The essay storage unit 510 may receive and store essays of each of a plurality of college student members.

In this case, the college student member may input search criteria regarding the essay. The search criteria may include a search keyword contained in the essay, a name of an applied school, an admission year, admission results, etc., and the name of the applied school does not always need to be identical to a name of a school which the college student member currently attends, as described above with reference to FIG. 5.

Meanwhile, a buyer who wants to get an essay contacts a web site and inputs search criteria regarding desired essays through the essay criteria input unit 520, in operation 902.

The search criteria regarding the desired essays may include a school name, an admission year, an extracurricular activity, an essay keyword, and various test scores, and the buyer may search for the desired essays by using one or more of the search criteria, as described above with reference to FIG. 6.

The essay search unit 530 extracts the names of college student members who wrote the desired essays and extracts essays provided by the college student members from the database 150 illustrated in FIG. 1, by using the search criteria input through the essay criteria input unit 520 and criteria regarding the college student members which are stored in the database 150 illustrated in FIG. 1, in operation 903.

The buyer selects and pays for a desired essay from among the extracted essays and the essay providing unit 540 provides the paid essay to the buyer, in operation 904.

In this case, authority to only access the essay for a predetermined period of time, instead of an electronic file of the essay, may be provided to the buyer in order to prevent illegal distribution of the essay, as described above with reference to FIG. 5.

The buyer of the essay may evaluate the essay and evaluation information may be stored in the essay storage unit 510 together with the essay so as to be referred when other buyers select the essay, in operation 905.

Meanwhile, a service of reviewing another person's essay by a college student member may also be provided through the service providing unit 160.

Figure 10:
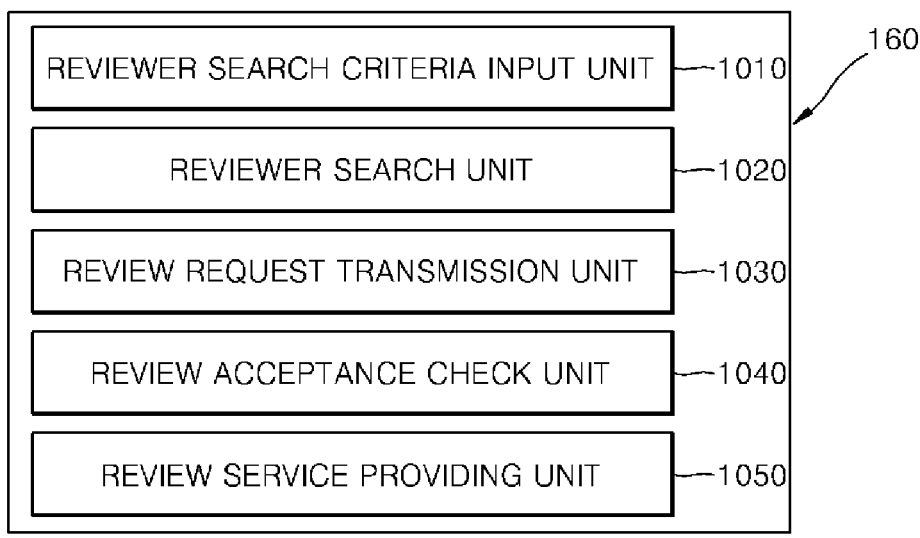
FIG. 10 is a block diagram of a service providing unit illustrated in FIG. 1 when an authenticated college student member provides a service of reviewing another person's essay based on his or her experience, according to an embodiment of the present invention.

FIG. 10 is a block diagram of the service providing unit 160 illustrated in FIG. 1 when an authenticated college student member provides a service of reviewing another person's essay based on his or her experience, according to an embodiment of the present invention.

The reviewing of the essay is performed by college student members who want to provide an essay review service. If a college student member wants to provide the essay review service, the college student member registers himself or herself as a reviewer when he or she joins a web site using a system according to an embodiment of the present invention.

Referring to FIG. 10, the service providing unit 160 according to the current embodiment of the present invention includes a reviewer search criteria input unit 1010, a reviewer search unit 1020, a review request transmission unit 1030, a review acceptance check unit 1040, and a review service providing unit 1050.

The reviewer search criteria input unit 1010 receives search criteria for a reviewer to review an essay written by a buyer, from the buyer.

Figure 11:
FIG. 11 is an image of a screen for inputting search criteria for a reviewer, according to an embodiment of the present invention.

FIG. 11 is an image of a screen for inputting search criteria for a reviewer, according to an embodiment of the present invention.

Referring to FIG. 11, the search criteria to be input are similar to search criteria to be input in order to search for an essay. However, the buyer may want his or her essays to be continuously reviewed by a certain reviewer and thus a user ID of a reviewer may also be a search criterion.

Referring back to FIG. 10, the reviewer search unit 1020 extracts the names of college student members who are reviewers, by using the search criteria input through the reviewer search criteria input unit 1010 and criteria regarding the college student members, which are stored in the database 150 illustrated in FIG. 1.

The review request transmission unit 1030 requests a reviewer who is selected by the buyer from among the extracted names of reviewers, to review the essay.

Since the essay review service takes a predetermined period of private time, although a college student member registered himself or herself as a reviewer, the essay review service may not be provided according to, for example, a schedule of the college student member when the buyer requests to review the essay.

Thus, the review request transmission unit 1030 transmits a review request message to the selected reviewer in order to check whether the essay review service is possible, before providing the review service.

When the review request transmission unit 1030 requests the reviewer to review the essay, the review request message includes information regarding an expected payment for the essay review service, which is calculated according to the number of words based on the essay uploaded by the buyer, a desired review due date, and a reply due date for review acceptance or refusal.

When the review request message is transmitted to the reviewer, the review request message may only be displayed on a screen that is output when the reviewer contacts the web site through the Internet, or may be transmitted as an email message or a short message service (SMS) text message by using an email address or a mobile phone number which were registered when the reviewer joined the web site.

The review acceptance check unit 1040 receives an input regarding the review acceptance or refusal in response to the review request message transmitted by the review request transmission unit 1030, from the college student member who is the reviewer.

It is preferable that the college student member who is the reviewer contacts the web site and inputs the review acceptance or refusal on an output screen of the web site.

If the essay review service is requested and accepted, and then the buyer pays for the essay review service, the review service providing unit 1050 informs the college student member who is selected as the reviewer, about the payment so that the essay review service can be performed. The review service providing unit 1050 provides a whole payment or a portion of the whole payment to the college student member.

When the reviewer reviews the essay, after the reviewer reviews the essay uploaded by the buyer, a review result may be displayed on the web site so as to allow the buyer to check the review result through the web site, or may be directly transmitted to the buyer through an email or any other communication means.

It is preferable that evaluation of the essay review service is received from the buyer as a feedback so as to be referred by other buyers.

Figure 12:
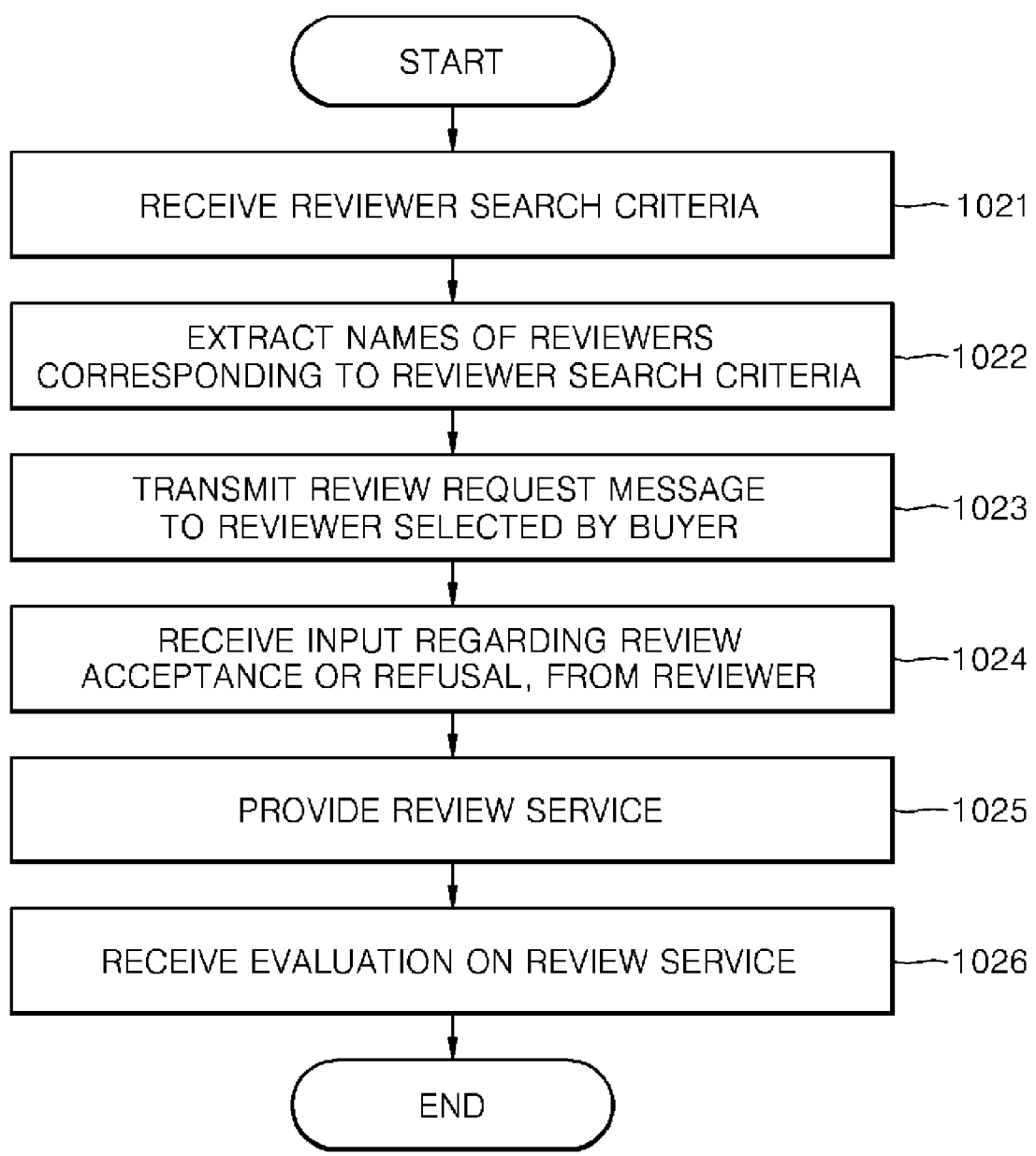
FIG. 12 is a flowchart of a method of providing an essay review service, according to an embodiment of the present invention.

FIG. 12 is a flowchart of a method of providing an essay review service, according to an embodiment of the present invention. FIG. 12 will be described in conjunction with FIG. 10.

Referring to FIG. 12, initially, the reviewer search criteria input unit 1010 receives search criteria for a reviewer to review an essay written by a buyer, from the buyer, in operation 1021.

The reviewer search unit 1020 extracts the names of college student members who are reviewers, by using the search criteria input through the reviewer search criteria input unit 1010 and criteria regarding the college student members, which are stored in the database 150 illustrated in FIG. 1, in operation 1022.

In this case, the reviewer search unit 1020 extracts the names of the reviewers from among college student members who registered themselves as reviewers.

The review request transmission unit 1030 requests a reviewer who is selected by the buyer from among the extracted names of reviewers, to review the essay, in operation 1023.

As described above with reference to FIG. 10, the review request transmission unit 1030 requests the reviewer to review the essay, the review request transmission unit 1030 transmits a review request message including information regarding a an expected payment for the essay review service, a review due date, and a reply due date for review acceptance or refusal.

Also, as described above with reference to FIG. 10, the review request message may be displayed on a web site, or may be transmitted as an email message or an SMS text message.

The review acceptance check unit 1040 receives an input regarding the review acceptance or refusal from the reviewer, in operation 1024.

If the essay review service is requested and accepted, and then the buyer pays for the essay review service, the review service providing unit 1050 provides the essay uploaded by the buyer, to the reviewer so that the essay review service can be performed. The review service providing unit 1050 provides a whole payment or a portion of the whole payment to the college student member right after the reviewer uploads a review of the essay so as to complete the essay review service, in operation 1025.

Meanwhile, it is preferable that the review service providing unit 1050 receives evaluation on the review from the buyer, stores the evaluation on the database 150 illustrated in FIG. 1, and displays the evaluation when the reviewer search unit 1020 outputs extracted names of reviewers, so as to be referred when other buyers select the reviewer, in operation 1026.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

As described above, according to the present invention, identities of college students may be simply and reliably verified and thus buyers may more reliably get services such as essay providing and review services based on the identity verification.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A service providing method based on authentication of college students operated in a server system, the service providing method comprising:

receiving by a device at least a name of a school from a member who wants to be authenticated as a college student who attends the school and has an email address issued by the school, in an input unit;

receiving by said device, an email address of a fellow student of the school, from the member, in the input unit;

verifying whether the email address is issued by the school by using the name of the school and the email address;

creating and transmitting by said device a first verification code of the member to the email address, in a verification code transmission unit;

creating and transmitting by said device, a third verification code of the fellow student to the email address of the fellow student, in the verification code transmission unit;

receiving by said device a second verification code from the member and a fourth verification code from the fellow student, and transforming by said device a status of the member to be an authenticated college student if the value of the second verification code and the value of the fourth verification code is identical to the value of the third verification code, in an authentication unit; and providing by a web application server, a service of the member whose status has been transformed to be an authenticated college student by the authentication unit, to a buyer who requests the service, in a service providing unit;

wherein the providing of the service comprises:

receiving and storing an essay which is written by the member whose status has been transformed to be an authenticated college student, for an entrance examination;

receiving an essay search criteria from the buyer wherein the essay search criteria comprises a score in the entrance examination of the member whose status has been transformed to be an authenticated college student;

extracting essays corresponding to the search criteria, from among stored essays; and providing an essay which is selected by the buyer from among the extracted essays, to the buyer.

2. The service providing method of claim 1, further comprising providing abstract of the extracted essay and information regarding the member whose status has been transformed to be an authenticated college student, who wrote the extracted essay, which comprises the name of the school attended by the member whose status has been transformed to be an authenticated college student, and a score in an entrance examination of the member whose status has been transformed to be an authenticated college student.

3. The service providing method of claim 1, wherein the providing of the essay comprises providing authority to access the essay which is selected by the buyer, for a preset period of time.

4. The service providing method of claim 1, further comprising receiving the essay search criteria comprising a name of a school where the essay of the member whose status has been transformed to be an authenticated college student, is submitted.

5. The service providing method of claim 1,
wherein the service provided through the service providing unit is an essay review service, and
wherein the providing of the service comprises:
receiving reviewer search criteria for a reviewer to provide the essay review service, from the buyer;
extracting names of reviewers corresponding to the reviewer search criteria, from a plurality of the member whose status has been transformed to be an authenticated college student, who registered themselves as reviewers;
transmitting a review request message to a reviewer who is selected by the buyer from among the extracted names of reviewers;
receiving an input regarding review acceptance or refusal in response to the review request message, from the reviewer who the review request message is transmitted to; and
providing an essay of the buyer to the reviewer who accepted the essay review service so that the reviewer can review the essay.

6. The service providing method of claim 5, wherein the transmitting of the review request message comprises transmitting the review request message comprising information regarding a reply due date for the review acceptance or refusal, a desired review due date, and an expected payment for the essay review service.

7. The service providing method of claim 5, further comprising providing evaluation on the essay review service, which is received from the buyer who the reviewer has provided the essay review service to.

8. A service providing method based on authentication of college students operated in a server system, the service providing method comprising:

receiving by a device, at least a name of a school from a member who wants to be authenticated as a college student who attends the school and has an email address issued by the school, in an input unit;

receiving by said device, an email address of a fellow student of the school, from the member, in the input unit;

creating and transmitting by said device, a first verification code of the member to the email address, in a verification code transmission unit;

creating and transmitting by said device, a third verification code of the fellow student to the email address of the fellow student, in the verification code transmission unit;

receiving by said device, a second verification code from the member and a fourth verification code from the fellow student, and transforming by said device a status of the member to be an authenticated college student if the value of the second verification code is identical to the value of the first verification code and the value of the fourth verification code is identical to the value of the third verification code, in an authentication unit; and providing by a web application server, a service of the member whose status has been transformed to be an authenticated college student by the authentication unit, to a buyer who requests the service, in a service providing unit, wherein the service is an essay providing service, and
wherein the providing of the service comprises:
receiving and storing an essay which is written by the member whose status has been transformed to be an authenticated college student, for an entrance examination;
receiving an essay search criteria from the buyer;
receiving the essay search criteria comprising a name of a school where the essay of the member whose status has been transformed to be an authenticated college student, is submitted;
extracting essays corresponding to the search criteria, from among the stored essays;
providing an essay which is selected by the buyer from among the extracted essays, to the buyer; and
providing abstract of the extracted essay and information regarding the member whose status has been transformed to be an authenticated college student, who wrote the extracted essay, which comprises the name of the school attended by the member whose status has been transformed to be an authenticated college student, and a score in an entrance examination of the member whose status has been transformed to be an authenticated college student, wherein the essay search criteria comprise a score in the entrance examination of the member whose status has been transformed to be an authenticated college student,
wherein the providing of the essay comprises providing authority to access the essay which is selected by the buyer, for a preset period of time.

9. A service providing method based on authentication of college students operated in a server system, the service providing method comprising:
receiving by a device, at least a name of a school from a member who wants to be authenticated as a college student who attends the school and has an email address issued by the school, in an input unit;
receiving by said device, an email address of a fellow student of the school, from the member, in the input unit;
creating and transmitting by said device, a first verification code of the member to the email address, in a verification code transmission unit;
creating and transmitting by said device, a third verification code of the fellow student to the email address of the fellow student, in the verification code transmission unit;
receiving by said device, a second verification code from the member and a fourth verification code from the fellow student, and transforming by said device a status of the member to be an authenticated college student if the value of the second verification code is identical to the value of the first verification code and the value of the fourth verification code is identical to the value of the third verification code, in an authentication unit; and
providing by a web application server, a service of the member whose status has been transformed to be an authenticated college student by the authentication unit, to a buyer who requests the service, in a service providing unit,
wherein the service provided through the service providing unit is an essay review service, and wherein the providing of the service comprises:
receiving reviewer search criteria for a reviewer to provide the essay review service, from the buyer;
extracting names of reviewers corresponding to the reviewer search criteria, from a plurality of the member whose status has been transformed to be an authenticated college student, who registered themselves as reviewers;
transmitting a review request message to a reviewer who is selected by the buyer from among the extracted names of reviewers;
receiving an input regarding review acceptance or refusal in response to the review request message, from the reviewer who the review request message is transmitted to;
providing an essay of the buyer to the reviewer who accepted the essay review service so that the reviewer can review the essay; and
providing evaluation on the essay review service, which is received from the buyer who the reviewer has provided the essay review service to,
wherein the transmitting of the review request message comprises transmitting the review request message comprising information regarding a reply due date for the review acceptance or refusal, a desired review due date, and an expected payment for the essay review service.

* * * * *